US007440952B1

(12) United States Patent
Satoh et al.

(10) Patent No.: US 7,440,952 B1
(45) Date of Patent: Oct. 21, 2008

(54) SYSTEMS, METHODS, AND COMPUTER PRODUCTS FOR INFORMATION SHARING USING PERSONALIZED INDEX CACHING

(75) Inventors: Fumiko Satoh, Tokyo (JP); Toyotaro Suzumura, Kawasaki (JP); Issei Yoshida, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/958,415

(22) Filed: Dec. 18, 2007

(51) Int. Cl.
*G06F 17/30* (2006.01)
(52) U.S. Cl. .............................. 707/10; 707/3; 709/220
(58) Field of Classification Search ........................ None
See application file for complete search history.

(56) References Cited

U.S. PATENT DOCUMENTS

| 5,983,216 | A | 11/1999 | Kirsch et al. |
| 6,505,205 | B1 | 1/2003 | Kothuri et al. |
| 7,032,000 | B2 * | 4/2006 | Tripp ........................ 709/202 |
| 7,054,867 | B2 * | 5/2006 | Bosley et al. .................. 707/10 |
| 2004/0122958 | A1 * | 6/2004 | Wardrop ..................... 709/229 |
| 2005/0240591 | A1 * | 10/2005 | Marceau et al. ................ 707/9 |

* cited by examiner

Primary Examiner—Debbie M Le
(74) Attorney, Agent, or Firm—Cantor Colburn LLP; Vazkan Alexanian

(57) ABSTRACT

Systems, methods, and computer products for information sharing using personalized index caching. Exemplary embodiments include a method including receiving a search query history from a node X in a node A, extracting characteristics of an index of the node A, searching the extracted characteristics, which include a file ID that is included in the index of the node A, adding metadata information to the index of the node A, in response to a determination that the node A includes at least one additional local metaindex, searching the at least one additional metaindex with the search query history from the node X in the node A, and merging search results with the metaindex of the node A, wherein the one additional metaindex merged to the metaindex of the node A includes an acquisition path, and sending the metaindex of the node A to the node X.

2 Claims, 5 Drawing Sheets

SYSTEMS, METHODS, AND COMPUTER PRODUCTS FOR INFORMATION SHARING USING PERSONALIZED INDEX CACHING

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to information sharing, and particularly to systems, methods, and computer products for information sharing using personalized index caching.

2. Description of Background

In information sharing scenarios between multiple information nodes hereafter, nodes) connected on a network, for a certain node to search for information on another node, various techniques such as peer-to-peer (P2P) or desktop search technologies through remote operation are employed. However, in all techniques to date, it is assumed that all of the nodes involved at the time of searching are connected to the network (hereafter referred to as online). Accordingly, for nodes not connected to the network (hereafter called "offline"), it is impossible to perform searches, or it is only possible to search for the target (in a text search system, the target is the text) in what is resident in cache.

SUMMARY OF THE INVENTION

Exemplary embodiments include a method of creating a metaindex from an index of a node A to which meta information is added, the method in a computer system having a local disk and including receiving a search query history from a node X in the node A, extracting characteristics of an index of the node A, wherein the characteristics include keywords that reflect an interest from the node A, searching the extracted characteristics, which include a file ID that is included in the index of the node A, adding metadata information to the index of the node A, in response to a determination that the node A includes at least one additional local metaindex, searching the at least one additional metaindex with the search query history from the node X in the node A, and merging search results with the metaindex of the node A, wherein the one additional metaindex merged to the metaindex of the node A includes an acquisition path, and sending the metaindex of the node A to the node X.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution in which a node, once connected to the network, connects directly to other nodes on the network and receives information in a suitable form. Thereafter, even if the node is offline, through exemplary methods described herein, it is able to search information held on other nodes without signification drop in search success. In exemplary embodiments, based on the supposition that "Each node maintains a search index", a node can perform a file search of other nodes even when it is offline.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
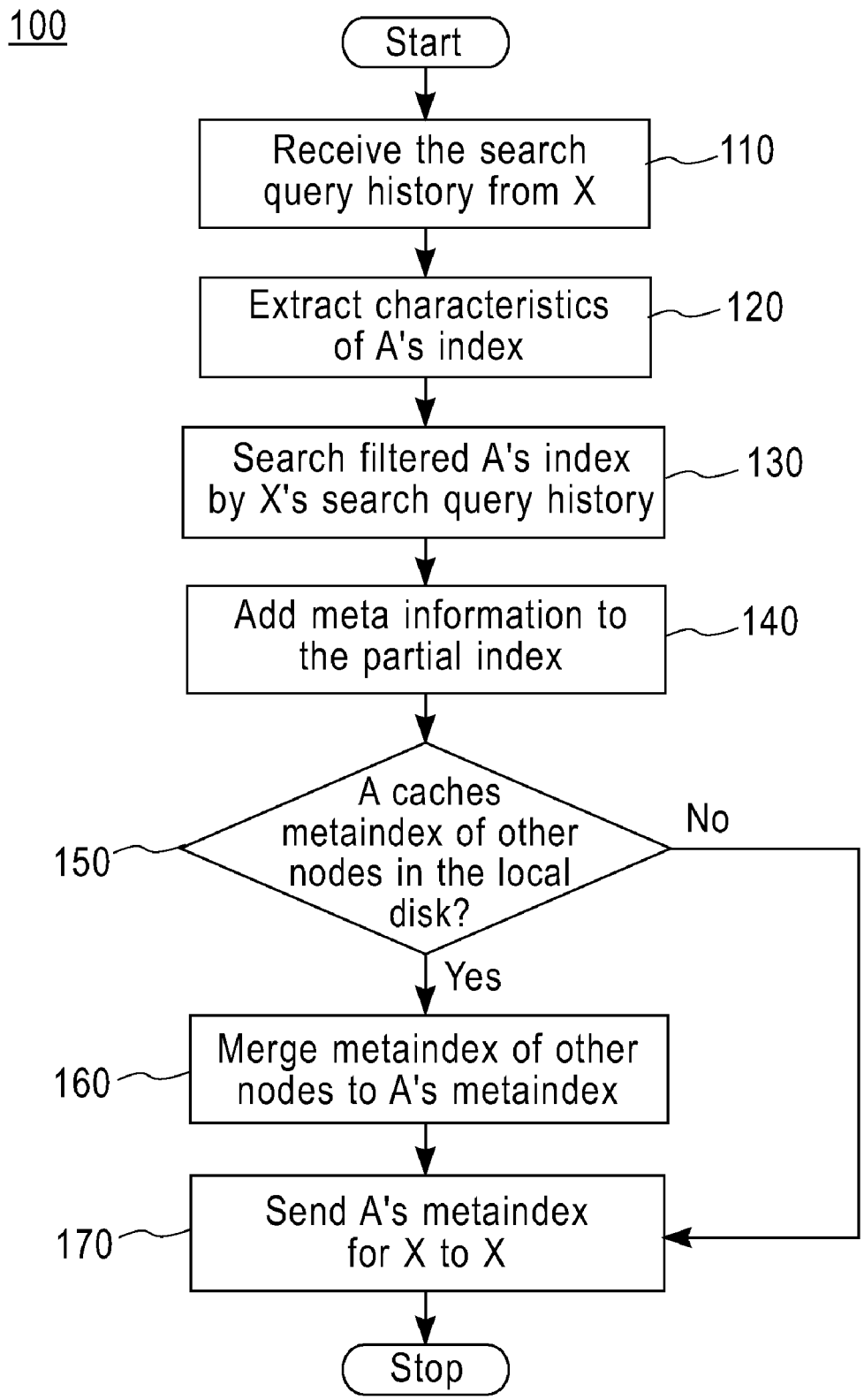
FIG. 1 illustrates a flow chart of a method for constructing a metaindex of a node A in accordance with exemplary embodiments.

The detailed description explains the preferred embodiments of the invention, together with advantages and features, by way of example with reference to the drawings.

DETAILED DESCRIPTION OF THE INVENTION

In exemplary embodiments, a node once connected to the network, connects directly to other nodes on the network and receives information in a suitable form. Thereafter, even if the node is offline, through exemplary methods described herein, it is able to search information held on other nodes without signification drop in search success. In exemplary embodiments, based on the supposition that "Each node maintains a search index", a node can perform a file search of other nodes even when it is offline.

In exemplary embodiments, when a local copy of the index of another node is made during connection, its own search query history is used to personalize the index of the other node and the size of the index is reduced. By using its own search query history, the local copy of the index from the other node can be personalized without significantly reducing its accuracy (success rate). In exemplary embodiments, when updating the local copy of the remote node's index, only search queries that haven't previously been sent (difference history), and search queries containing keywords related to those search queries (related history) are used from the local search query history. In exemplary embodiments, for the related history keywords for a search query, by using the "degree of similarity of the difference history keywords and search query history keywords" combined with "the number of days since the search query history keyword was last sent", it is expected that keywords resulting in the freshest information can be effectively determined. In exemplary embodiments, the personalized index, which is derived from indexes of other nodes, is referred to as a "metaindex" in this innovation. Below the structure of the metaindex and process by which it is generated is shown.

in exemplary embodiments, an index, as shown below, is a list of file IDs and attributes, and keyword set. The metaindex is a part of the desktop search index (hereafter referred to as partial index) to which metadata information has been attached. The following is an example of the index:

Index={(FileID=1, file attributes, k1="Web service", k2="SOA", . . . ), (FileID=2, file attributes, k1="DB2", k2= "search", . . . ) . . . }

File attributes are the information about each file, such as:

File attributes={file name, date renewed, file size, summary}

In exemplary embodiments, "summary" can be the first few lines of content of a text file, or in the case of a binary file, annotation such as keywords describing the contents of the file. In addition, meta information attached to the index and can be in the form as follows:

Meta information={index owner, owner access method, each file's access policy list, acquisition path of metaindex}

In exemplary embodiments, to create a metaindex of node A for node X, parts containing keywords that X has an interest in are extracted from A's index. The list of search queries that X has used up to that point is saved as a search query history, and this search query history is used as a list of keywords in which X has interest.

In exemplary embodiments, the search query history is a list of sets comprising the keywords that the user has used previously in local searches along with the time that those keywords were sent to A (w, t). ("XML", 2007/01/01) and ("Fixed assets", 2007/04/01), for example. To improve the success rate of searches, synonyms for each keyword and other keywords from texts that are found on searching (using existing tf-idf weighting etc.) can also be added to the list and recorded. The time for these added keywords is set to the same time as the original keyword time.

In exemplary embodiments, when searches are made on A's index using X's search query history, an OR search on the list of keywords is usually performed, but depending on the objective, different methods may also be used. For example, in the case where "greater weight is placed on keywords used recently", the weight of each document can be defined as weight $w(d)=\Sigma g(t\_k)$ using the monotonic increase function $g(t)$ (time t) (sum is, (w_k, t_k) of all keywords included in the document).

As further described herein, the method for creating metaindex for node X (hereafter referred to as X) of node A (hereafter referred to as A) is now described. FIG. 1 illustrates a flow chart of a method 100 for constructing a metaindex of a node A in accordance with exemplary embodiments. At block 110, A receives the search query history from X. At block 120, A extracts characteristic portions from its own index (filtering). Characteristic portions are those parts of the large index containing keywords which reflect interest from A. Extraction of characteristic portions could employ methods such as keyword extraction based on evaluation of frequency of use, or extraction based on phrases of, for example, a particular noun, etc. In exemplary embodiments, this step can be omitted in cases where the search engine already has functionality to perform this.

At block 130, using the search query history from X, the filtered index from block 110 is searched. File data including the file ID found on this search forms the partial index of A. At block 140, to the partial index of at block 130, the following meta-information is added forming the metaindex of A:

meta information={index owner, access method to owner, access policy list for each file, acquisition path of metaindex}

At block 150, if A has local metaindexes of nodes C, D etc., searches are also made on the metaindexes of C and D using the search query history of X and results are merged with the metaindex of A at block 160. In merging, the acquisition path of the metaindex from the meta information can be updated. That is, if the metaindex of C is being merged to the metaindex of A, the acquisition path of index can be rewritten as "C cached on A". At block 170, A sends the metaindex to X.

By construction of a metaindex for A cached locally on X, even while offline, X can search the metaindex of A and files held on A can be searched by X. Because of the enormous size of index A itself, it is not realistic to cache the index as is. But it is possible to create and cache a metaindex of A tailored for X, without significantly lowering search hit rate and still reducing the size. Also in the case where A has metaindexes of other nodes, these other metaindexes can be merged with the A metaindex and supplied to X. It is therefore possible for X to search the combined information from another node C as information held on A.

In updating the metaindex of A, when X sends the search query history on subsequent occasions, it doesn't just send the search query history as is, it sends the search query history dated after the search query history was sent previously (hereafter referred to as difference history), along with search query history already sent prior to the previous send that contain keywords highly related to the difference history (hereafter referred to as related history). In exemplary embodiments, the following principle is the basis of selection of the related history. For keywords that are highly related to a certain keyword in the difference history, even if the elapsed period since it was last sent is short, it is sent again and new information is obtained. For keywords that are not related to a certain keyword in the difference history, even if the elapsed period since it was last sent is long, it is not sent again.

Figure 6:
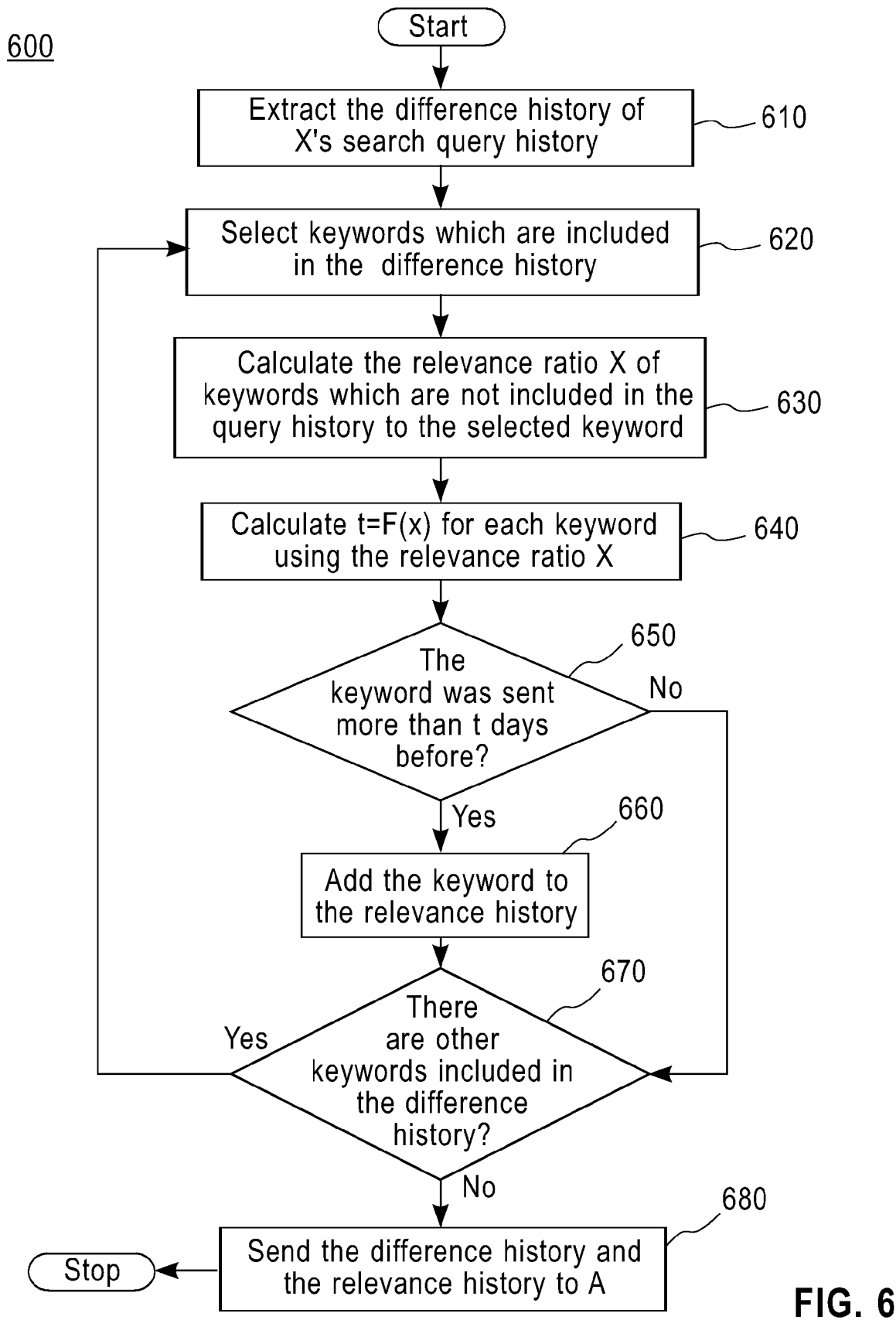
FIG. 6 illustrates a flow chart of a determination method of related history in accordance with exemplary embodiments.

Based on this principle the method whereby related history is determined is discussed with respect to FIG. 6 that illustrates a flow chart of a determination method 600 of related history in accordance with exemplary embodiments. In exemplary embodiment, the method 600 is performed locally on each node. At block 610, the difference of X's search query history is extracted. For each keyword included in the difference history Kd, a search is performed for related keywords from the search query history. At block 620, keywords are selected which are included in the difference history. At block 630, a relevance ratio x of keywords which are not included in the query history to the selected keyword, is calculated. For each keyword Ks which is not included in the difference history but included in the search query history, relevance ratio x, the degree of similarity between Kd and Ks, is calculated. x has a value between 0 and 1. At block 640, $t=F(x)$ is calculated for each keyword using the relevance ratio x. In exemplary embodiments, using the monotonic decrease function for $F(x)$, satisfied by $F(0)=+\infty$, $F(1)=0$, calculate the value $T=F(x)$. Comparing the calculated value $T=F(x)$ with the number of days elapsed since the keyword Ks was last sent Ts, Ks is included in the related history where T<Ts. At block 650, if the keyword was sent more than t days before then at block 660 the keyword is added to the relevance history, then at block 670 it is determined whether there are other keywords included in the difference history. If not, then at block 680 the difference history and the relevance history is sent to A. If it is determined that there are other keywords included in the difference history at block 670, then block 620 and subsequent blocks are repeated.

Figures 2, 3:
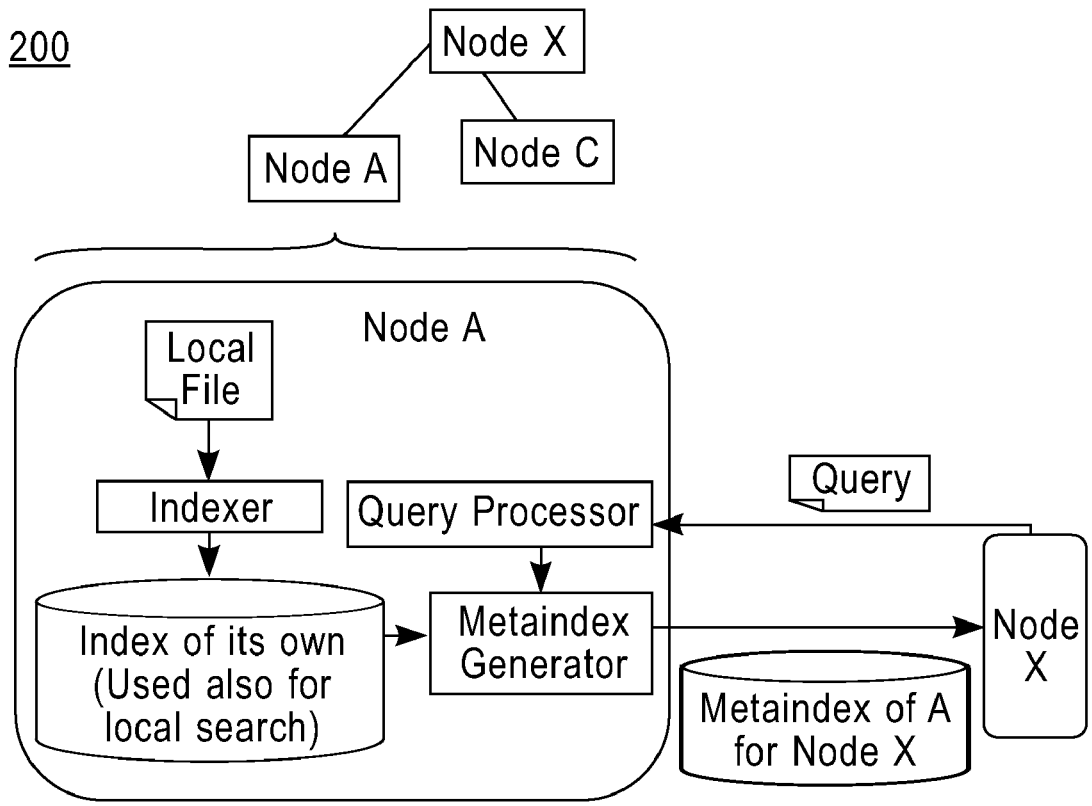
FIG. 2 illustrates a block diagram of an exemplary metaindex construction system.
FIG. 3 illustrates an example of a partial index in accordance with exemplary embodiments.

In exemplary embodiments, in the case where X desires to know information held on A, each node has an operating desktop search service and a file index is maintained. When X desires information held on A, a query can be sent to A's search service and the result can be received by X, which is only effective if A and X are both connected to the network. For X to be able to search while it is offline, it would be possible if it stores a local copy of A's index. However, desktop search indexes are typically extremely large (varying according to the number of documents, but in some cases as large as several GB). Therefore, rather than cache the index of A as is, a metaindex created from part of the index to which meta information is added according to the method 100 as shown in FIG. 1 is cached. FIG. 2 illustrates a block diagram of an exemplary metaindex construction system 200.

In exemplary embodiments, to create a metaindex of A for node X, portions containing keywords that X has interest in are extracted from the index of A. For this, a list of search queries that X has made up to that point is saved as a search query history, and the search query history is used as a list of keywords that X has interest in. Next, construction of a metaindex using a concrete example is shown.

Index of A includes the files held on A with a corresponding collection of keywords they include. The data of this index can be shown as the matrix in FIG. 3 that illustrates an example of a partial index in accordance with exemplary embodiments. In the example, F1, F2 . . . are file IDs, and k1, k2 . . . are keywords included in these files. Also, this index is in the order of keywords included in the largest number of files.

In the example of FIG. 3, keywords k1, k2, k3, k4, k5 are contained in a larger number of files than other keywords, and within these keywords k3, k4 and k5 have been filtered by, for example, part of speech information or frequency threshold. On index data derived in this way, a search is made on keywords contained in the search query history sent from X. If k4 and k5 are included in the search query history, a search would return columns k4 and k5. In this way, columns that are found using the search query history are included in the partial index. To this partial index, meta information is added and a metaindex of A is constructed for X.

To this metaindex the following meta information is added.
  owner=A
  owner access method=userA@ibm.com
  access policy for each file list={(1, private), (2, public), (3, protected) . . . }
  metaindex acquisition path=A
The list of access policies for each file consists of the file ID and the access policy for that file. Details of access policy are further described herein.

Figure 4:
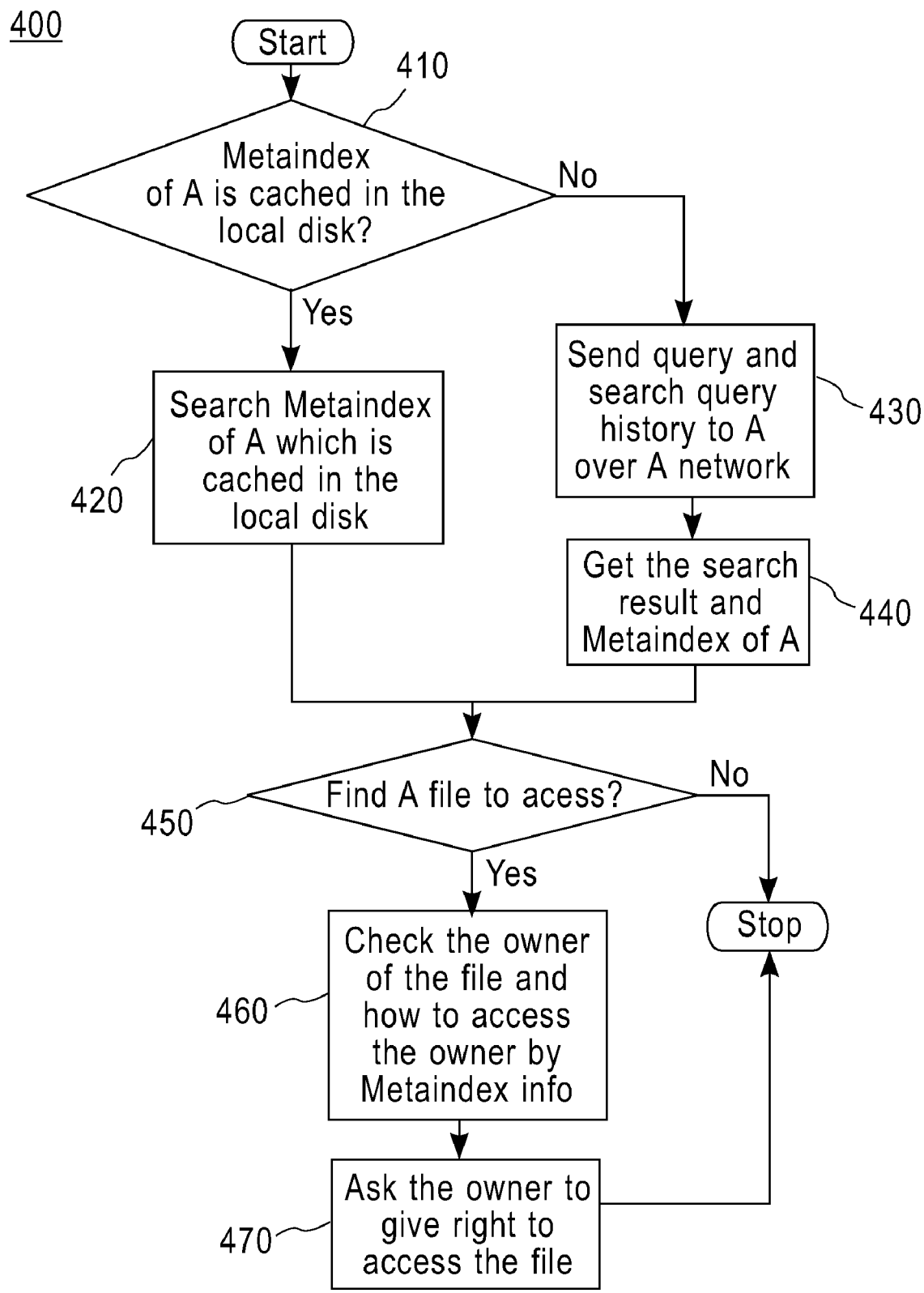
FIG. 4 illustrates a flow chart of a method for searching for information using a metaindex cached on a node X in accordance with exemplary embodiments.

In cases where node A holds a metaindex of C, the metaindex of C can be merged. Meta information of the merged metaindex of C can be described as:
  owner=C
  access method to owner=userC@ibm.com
  access policy of each file list={(1, public), (2, private), (3, private) . . . }
  acquisition path of metaindex=A(C)
The method of X performing searches for information on A using a metaindex of A created in this manner is shown in FIG. 4 that illustrates a flow chart of a method 400 for searching for information using a metaindex cached on a node X in accordance with exemplary embodiments. At block 410, X checks whether a metaindex of A is cached locally or not. If it is cached, by performing a search on the local metaindex of A, even if it is offline, X can search files from A at block 420. Also, if a metaindex of C is cached on A, because it is merged with the metaindex of A, at the same time as searching for information from A, information from other nodes can also be searched, even while offline.

In cases where there is no metaindex cached locally, X sends a search query along with the search query history over the network to A at block 430. A performs a desktop search using the search query received and at the same time, creates a metaindex for X using the search query history and sends this along with the result of the desktop search to X. X caches the received metaindex of A and therefore the next time a search is made it can be performed locally at block 440.

X checks the result of a search on the cache or the result returned from a desktop search of A at block 450, if the necessary file is available, information about that file contained in the meta information of the metaindex is referenced. From the referenced meta information, the file owner and access method to owner is examined at block 460. The access method to owner has information on how the owner can be accessed such as a mail address, and referencing the metaindex acquisition path, a request for the file is made to the owner at block 470.

In exemplary embodiments, updating the cache of a metaindex of another node is performed in cases such as where a number of days has passed since the last time the metaindex was obtained, where the metaindex is not cached, or where a search on the cache was unable to obtain a result. If a search on the metaindex was unable to obtain a result, a search query is sent directly over the network and at the same time the search result is received, a new metaindex is also received.

In exemplary embodiments, if X is resending the search query history to A, X does not send the complete search query history that it has, but sends only the portions of the search query history that have never been sent to A (difference history) along with portions of the search query history that are highly related to keywords contained in the difference history (related history). The time of the search query history for the difference history is blank. The related history is determined by consideration of the degree of relativity to keywords included in the difference history and the period of elapsed time since the search query history was last sent.

As an example, supposing X has the following search query history.
  ("XML",), ("study",), ("commuting costs", 2007/04/03),
  ("Java", 2007/04/01), ("Web browser", 2007/03/20),
  ("fixed assets", 2007/02/18),
At the current date and time of 2007/07/07, of the search query history that will be sent from X, the difference history is only the two items ("XML") and ("study"). These history items are without a time, that is to say, they have never previously been sent to another node for the creation of a metadata. It therefore follows that these kinds of new keywords should be included in search query history.

Figure 5:
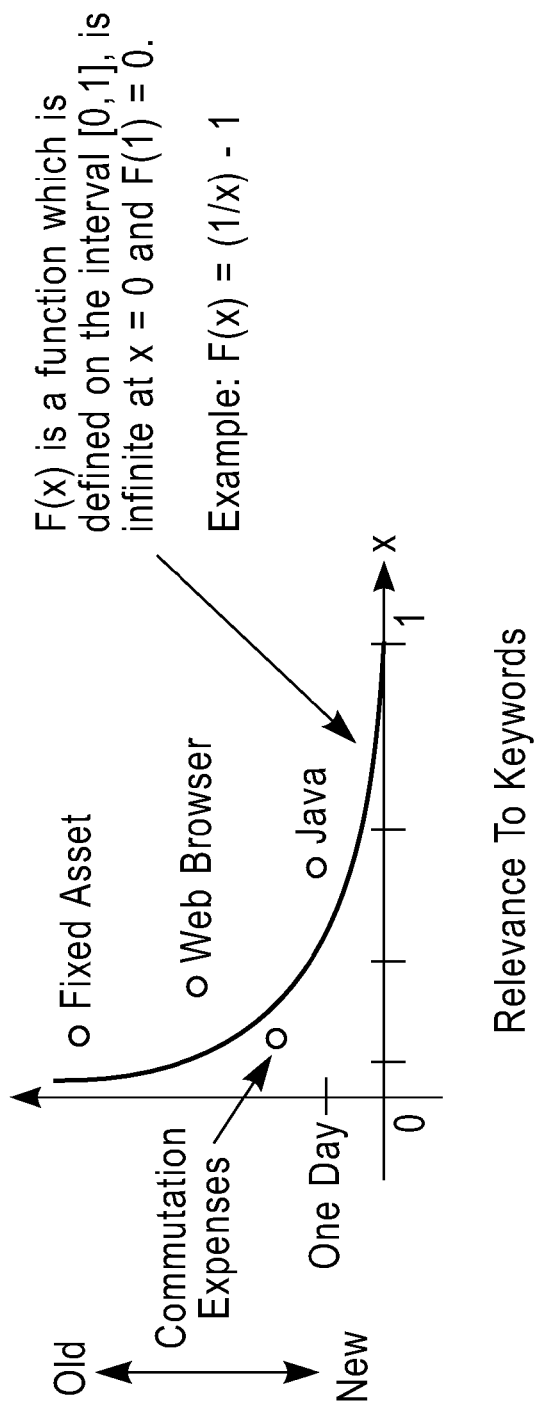
FIG. 5 illustrates an example of a relevance ratio and elapsed time for a keyword "XML,"

Also, as for deciding the related history which is related to the difference history, the relationship between each keyword from the difference history and the remaining keywords can be expressed as in FIG. 5, which shows the relationship between the keyword "XML" from the difference history and other keywords. The degree of relativity with "XML," x is shown on the horizontal axis with values ranging from 0 to 1. Degree of relativity with a value 1 is defined as having the highest relativity and 0 is regarded as having no relativity at all. For example, the degree of resemblance of the document vector stored in the metaindex can be used. For methods of calculating the degree of resemblance, existing methods such as the inner product of the document vector can be used. The vertical axis shows the elapsed time for each keyword since it was used for the creation of metadata t.

In determining the related history, based on the principle "XML is a recently searched keyword, thus interest at present is high. The newest information is required for metadata searched on keywords highly related to such keywords.", and for a certain keyword the time period until it is resent as related history can be expressed as t=(1/f(x))−1. Here f is a monotonic increase function, and is satisfied by f(0)=0 (strictly, limf(x)→0 (x→+0)), f(1)=1. The search query history is included in the related history if the number of days elapsed since the search query history is greater than t. For example, keywords with a relevance ratio to XML of 1, are included in the related history irrespective of the time elapsed since the metadata was created, and keywords with a relevance ratio of 0, not being of interest to current searching, are not normally included in the related history. In FIG. 5, ("Java", 2007/04/01), ("Web browser" 2007/03/20), and ("fixed assets", 2007/02/18) are included in the related history.

In exemplary embodiments, difference history and related history of X determined in this manner is sent to A and a new metaindex is made. However, it is possible to include file information included in the metaindex previously sent to X in the new metaindex. With regard to file information previously sent, only the file II) is included in the new metaindex. After X receives the new metaindex, it is merged with the locally cached metaindex for use.

To facilitate the update of old metaindex cache items, the metaindex cache item can be destroyed. If the metaindex cache item cannot be found, local searching would not be possible and a direct inquiry would be made and a new metaindex obtained.

In order to facilitate the disposal of the metaindex items, X decides the date of validity of the metaindex cache and cache items are destroyed when they pass the validity date. Alternatively, the metaindex cache size upper limit could be decided, and when this size limit is exceeded, items are deleted in order of their age from oldest items.

In exemplary embodiments, when caching a metaindex of another node, for the protection of privacy of the other node access control needs to be considered. For this reason, access policy for each file is included in the metaindex metadata. Access policy information is designated as one of the following levels: 1. private (private); 2. unmergeable (protected); 3. unrestricted (public); 4. mergeable once only; 5. accessible to designated nodes only. In this way access policy for each file can be determined. For example, restriction is possible such that, if a file's access restriction was set to "private", that file's information would not be included at metaindex creation. Again, in the case of an "unmergeable" designation, a certain node with a cache of a metaindex of another node, can not merge that metaindex with its own to send to a third node. In this way, in the event of creating a metaindex, by reference to the access policy, only files to which access is allowed are included in metaindex creation and privacy protection is possible.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having a local disk, a method of creating a metaindex from an index of a node A to which metadata information is added, the method comprising:

in response to a determination that the metaindex of the node A is cached on the local disk, searching the metaindex of the node A;

locating a file for access;

determining ownership of the file to access information associated with the metaindex of the node A;

obtaining permission to access the tile;

extracting characteristics of an index of the node A, wherein the characteristics include keywords that reflect an interest from the node A;

receiving a search query history from a node X in the node A;

searching the extracted index of the node A, which include a file ID;

adding metadata to the index of the node A;

in response to a determination that the node A includes at least one additional local metaindex, searching the at least one additional metaindex with the search query history from the node X in the node A, and merging search results with the metaindex of the node A, wherein the one additional metaindex merged to the metaindex of the node A includes an acquisition path;

extracting a difference history of the search query history from the node X in the node A;

selecting keywords that are included in the difference history;

calculating a relevance ratio of keywords that are not included in the difference history with a selected keyword;

calculating a time value for each keyword with the relevance ratio;

in response to a determination that the keyword was sent a time greater than the time value, adding the keyword to a relevance history:

in response to a determination that there are no other keywords included in the difference history, sending the difference history and the relevance history to the node A; and sending the metaindex of the node A to the node X.

2. The method as claimed in claim 1 further comprising:

in response to a determination that the metaindex of the node A is not cached on the local disk, sending a query and the search query history from the node X in the node A over a network coupled to the computer system;

obtaining a search result from the network;

obtaining the metaindex of the node A;

locating a file for access;

determining ownership of the file to access information associated with the metaindex of the node A; and obtaining permission to access the file.

\* \* \* \* \*